United States Patent Office 3,817,930
Patented June 18, 1974

3,817,930
LIQUID POLYMERCAPTO ADHESION PROMOTING AGENTS ADAPTED TO BE INCORPORATED IN POLYSULFIDE SEALANT COMPOSITIONS TO IMPROVE THE ADHESION THEREOF AND POLYSULFIDE SEALANT COMPOSITIONS CONTAINING THE SAME
José L. Villa, Heightstown, N.J., assignor to Thiokol Chemical Corporation, Bristol, Pa.
No Drawing. Filed Dec. 13, 1971, Ser. No. 207,571
Int. Cl. C08g 22/10, 39/10
U.S. Cl. 260—75 S                                   19 Claims

ABSTRACT OF THE DISCLOSURE

A sealant composition based on liquid polysulfide polymers that are curable by oxidative curing agents to rubber-like form and having improved adhesion after curing to substrates such as glass, aluminum and concrete is obtained by incorporating in the sealant composition an adhesion promoter which is a linear condensation product of a dicarboxylic acid and a dihydric alcohol. At least one of the dicarboxylic acid and dihydric alcohol has a reactive mercapto group thereon to provide a curing site by means of which the adhesion promoter may enter into the oxidative cure of the liquid polysulfide polymer base. The reaction mixture from which the adhesion promoting linear condensation product is made also includes a thiodiglycol and the condensation product has an average of 200 to 1500 molecular weight units per mercapto group.

---

This invention relates to sealant compositions based on liquid polysulfide polymers that are curable to rubber-like form and more particularly to the improvement of the adhesion of such compositions to substrates such as glass, aluminum and concrete.

Polysulfide polymers in general have been known for many years. In general, they may be prepared by reacting with alkali metal or alkaline earth metal sulfide solutions with difunctional organic halides, usually containing a small amount, say 1% to 4%, of trifunctional compounds to provide cross-links, to produce high molecular weight polymers having the recurring unit (RSS) wherein R is a divalent organic radical that may vary widely in its specific structure and SS represents a disulfide linkage through which the organic radicals are interconnected. The polymers thus obtained are high molecular weight polymers characterized by exceptional resistance to acids, alkalis, petroleum hydrocarbons and atmospheric oxidation.

The liquid polysulfide polymers can be obtained from the high molecular weight polymers referred to above by a splitting process described in U.S. Pat. 2,466,963. As disclosed in the latter patent, the high molecular weight polymers can be split to form polythiopolymercaptan polymers having molecular weights of the order of 500 to 25,000 which are viscous liquids having viscosities in the range 300 to 100,000 centipoises at 25° C. Such liquid polymers can be cured by any of various curing agents disclosed in U.S. Pat. 2,466,963 to form solid elastomers having the exceptional resistance to solvents and atmospheric oxidation and moisture referred to above.

In the commercially important liquid polymers the R of the (RSS) groups is generally a hydrocarbon or oxahydrocarbon group, for example, a diethyl formal group to produce polymers essentially composed of the recurring

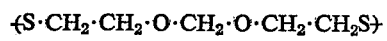

groups and having free mercapto terminals through which they may be cured to form a solid elastomer. Typical curing agents for the liquid polymers include inorganic peroxides, particularly peroxides of lead, zinc, calcium and barium.

Sealant compositions based on such liquid polysulfide polymers are also known in the art and are disclosed, for example, in U.S. Pats. 2,910,922; 3,225,017; 3,316,194; 3,349,047; and 3,536,562. Such sealant compositions commonly comprise in addition to the liquid polysulfide polymer and curing agent therefor various special purpose additives such as fillers, plasticizers, curing rate modifiers, adhesion promoters and the like. The sealant compositions are useful in such applications as sealing cracks in and adhesively bonding joints in cementitious materials used in the construction of roads, airfields, canals and buildings, as well as bonding glass to metals, as for example in sealing panes of glass in aluminum or other metal frames. When so used, they provide elastomeric bonds that retain their desirable physical characteristics over long periods of time.

While the liquid polymers themselves exhibit some degree of adherence to substrates of the type mentioned above, there are many applications for which their adhesivity is inadequate and for this reason an adhesion-promoting additive is commonly incorporated in the sealant composition. Numerous materials have previously been proposed for use as adhesion promoters in liquid polysulfide sealant compositions, but these prior compositions fail to meet the exacting requirements of some applications for which the polysulfide sealants are potentially useful. For example, phenolic resins have been extensively used as adhesion promoters in polysulfide sealants, but the phenolic adhesion promoters tend to stain and discolor concrete and metal substrates to which the sealant is applied. In other cases the proposed adhesion promoters have adversely affected the outstanding chemical resistance of the cured sealants.

It is accordingly an object of the present invention to provide a polysulfide sealant composition containing a novel adhesion promoter that improves the adhesivity of the cured sealant to substrates such as glass, aluminum and cement. It is another object of the invention to provide an adhesion promoter which when incorporated in polysulfide sealants substantially improves the adherence thereof to substrates without staining or otherwise discoloring the substrates. It is still another object of the invention to provide an adhesion promoter which when incorporated in a polysulfide sealant not only improves the adherence of the cured sealant to substrates, but also improves the chemical resistance of the seals made therefrom. Other objects of the invention will be in part obvious and in part pointed out hereafter.

In accordance with the present invention a liquid adhesion promoter is used which is a linear condensation product of at least one dicarboxylic acid and at least one dihydric alcohol, at least one of which includes a mercapto group and at least one of the dihydric alcohols being a thiodiglycol. The mercapto groups of the mercapto dicarboxylic acid and/or dihydric alcohol provide curing sites that can be cured by the same curing agents as those used to cure the mercapto terminals of the polysulfide polymer used as a base for the sealant. The thiodiglycol serves to introduce sulfur atoms into the chain of the condensation product and thereby improve the chemical resistance of the cured sealant.

The mercapto groups of the mercapto dicarboxylic acid are desirably spaced at relatively wide intervals along the main chain of the condensation product. Such spacing can be conveniently achieved by incorporating in the reaction mixture to be used in forming the condensation product dicarboxylic acids containing no mercapto groups. Also the desired spacing of the mercapto groups can be obtained by using polyglycols containing no sulfur atoms either in addition to or instead of the mercapto dicarboxylic acids. In general, the spacing of the mercapto groups is such as to provide a condensation product having an average of from about 200 to 1500 molecular weight units per mercapto group.

The mercapto dicarboxylic acids useful in preparing the present adhesion promoters include thiomalic acid, mercaptoglutaric acid, 2-mercaptoadipic acid, 2-mercaptosebacic acid, 2-mercaptopimelic acid and the like. Aromatic acids such as the mercaptophthalic acids and their anhydrides may be used. Also the mercapto groups may be introduced into the polyester by using monothioglycerol and other mercapto-containing glycols and polyhydric alcohols. The thiodiglycols used may be thiodiethylene glycol, thiodipropylene glycol, thiodibutylene glycol, as well as higher molecular weight members of this series. In some cases it may be desirable to cap the ends of the polyester chain as, for example, by using carboxyl-terminated polyesters and reacting the carboxyl terminals with mercaptoethanol.

The desired spacing of the mercapto groups can be achieved by incorporating in the reaction mixture any suitable dicarboxylic acid free from mercapto groups such as adipic acid, azelaic acid, sebacic acid, glutaric acid, pimelic acid and the like. Aromatic acids such as phthalic acid and phthalic anhydride may also be used. The glycols free from mercapto groups that may be used to obtain the desired spacing of the mercapto groups along the chain may include polyalkylene glycols such as diethylene glycol, triethylene glycol, higher molecular weight polyethylene glycols such as Carbowax 400, propylene and butylene glycols and polyglycols, hexamethylene glycol, octamethylene glycol, octadecamethylene glycol and the like.

The polyester adhesion promoters of the present invention may be prepared using the conventional process conditions for making linear polyesters. The dicarboxylic acids, including the mercapto dicarboxylic acid, and the dihydric alcohols, including the thiodiglycol, are combined, with or without an esterification catalyst, in the presence of an azeotropic agent for water, such as benzene or toluene. The reactants are heated under reflux at about 125-150° C.—the temperature depending on the type and the quantity of azeotropic agent—until the theoretical quantity of water has been collected from the esterification mixture, or until the desired molecular weight has been achieved.

Either conventional acidic or basic esterification catalysts may be used if desired to accelerate the reaction. Typical acidic catalysts include mineral acids, such as sulfuric acid, p-toluenesulfonic acid, anhydrous metal halides such as zinc chloride, titanium tetrachloride or boron trifluoride-ether complex. Basic catalysts such as alkali metal and alkaline earth metal oxides, carbonates, or alcoholates may also be used. If use of a catalyst is selected, the amount of catalyst varies between about .01% and 3% based on the weight of the reactants. Preferably, however, no external catalyst at all is used, since it has been found that the esterification reaction will proceed normally to its conclusion during the course of several hours of reflux.

Polyesterification is considered to be complete when the theoretical quantity of water has been recovered from the azeotropic reaction and/or when the analysis of free carboxyl groups by conventional titrimetric analysis has reached a minimum value. If no catalyst has been used, the adhesion promoter can be used directly without further treatment. If a catalyst has been used, it may be optionally desirable to neutralize and remove the catalyst by water washing before the mercaptan-containing polyester is used. The adhesion promoter is desirably used to the extent of say about 0.5% to 10% by weight, based on the weight of the sealant composition.

In order to point out more fully the nature of the present invention the following illustrative examples are given of methods of making the present adhesion promoters and sealant formulations incorporating them. The LP-32 liquid polysulfide polymer used in the following examples had recurring units of the type indicated in the formula above with mercapto terminals, an average molecular weight of about 4000 and about 0.5% cross-linking.

EXAMPLE 1

A liquid polyester was prepared by mixing 1.319 moles of thiodiethylene glycol, 0.736 moles of azelaic acid and 0.736 moles of thiomalic acid and heating the resulting mixture in the presence of benzene to effect azeotropic removal of the water formed in the reaction. The resulting polyester was tested in the following base formulation containing the stated ingredients in the indicated parts by weight.

BASE FORMULATION

| | |
|---|---|
| LP-32 liquid polymer | 100 |
| $CaCO_3$ (Multiplex MM) | 25 |
| Anhydrous Clay (Icecap K) | 30 |
| $TiO_2$ (Titanox RA 50) | 10 |
| Chlorinated biphenyl (Arochlor 1254) | 35 |

Separate portions of this base formulation were mixed with 1% by weight and 5% by weight, based on the weight of liquid polymer in the base formulation, of the polyester prepared as described above and each of the mixtures was in turn mixed with a lead dioxide and a zinc dioxide curing paste. The lead dioxide curing paste was a 50:50 mixture of lead dioxide and chlorinated biphenyl (Arochlor 1254) and was used to the extent of 15 parts by weight based on the weight of the base formulation (7.5 parts based on the weight of liquid polymer). The zinc dioxide curing paste comprised 10 parts by weight of zinc dioxide, 10 parts of chlorinated biphenyl and 2 parts of amine accelerator (AMAX) and was used to the extent of 22 parts based on the weight of base formulation (11 parts based on the weight of liquid polymer).

Each of the resulting four mixtures was applied to a glass panel and an aluminum panel and cured thereon at atmospheric pressure and temperature in 16 to 24 hours. The panels were allowed to stand for 7 days in air at room temperature before being tested. In the case of the lead dioxide cured formulation good adhesion to the glass and aluminum was obtained at both the 1% and 5% levels without any staining of the aluminum. In the case of the zinc peroxide cured formulation good adhesion to the aluminum without staining was obtained at both the 1% and 5% levels.

EXAMPLE 2

A polyester was prepared as in Example 1 from 1.629 moles of thiodiethylene glycol, 1.629 moles of diethylene glycol, 1.674 moles of azelaic acid and 0.837 moles of thiomalic acid. The resulting polyester was added to the base formulation of Example 1 in an amount of 1% by weight, based on the weight of liquid polymer therein, and separate portions were cured with the lead peroxide and zinc peroxide curing agents on glass and aluminum panels. Good adhesion to the aluminum panel without staining was observed with the lead peroxide cured sample and good adhesion to the glass panel was observed with the zinc peroxide cured system.

EXAMPLE 3

A polyester was prepared as in Example 1 from 0.848 moles of thiodiethylene glycol, 0.848 moles of high molecular weight polyethylene glycol (Carbowax 400), 1.563 moles of adipic acid and 0.525 moles of thiomalic acid. The resulting polyester was added to the base formulation of Example 1 in an amount of 1% based on the weight of LP polymer in the base formulation, mixed with the lead dioxide paste as in Example 1 and applied to an aluminum panel. Good adhesion to the panel without staining was observed.

EXAMPLE 4

A polyester was prepared as in Example 1 from 1.583 moles of thiodiethylene glycol, 1.583 moles of diethylene glycol, 2.228 moles of phthalic anhydride and 0.557 moles of thiomalic acid. The resulting polyester was incorporated in separate portions of the base formulation of Example 1 to the extent of 1% and 5%, based on the weight of LP polymer, and separate portions containing 1% and 5% of the polyester were mixed with the lead dioxide and zinc peroxide curing pastes and applied to glass and aluminum panels. Aften curing good adhesion to the glass at both the 1% and 5% levels was observed in the case of the zinc peroxide cured material and good adhesion to the aluminum panel without staining at both the 1% and 5% levels was observed in the case of the lead dioxide cure.

It is, of course, to be understood that the foregoing Examples are intended to be illustrative only and that numerous changes can be made in the ingredients, proportions and conditions disclosed without departing from the spirit of the invention as defined in the appended claims.

What is claimed is:

1. A liquid sealant composition adapted to be cured by oxidative curing agents to an elastomeric seal having improved adhesion to substrates such as glass, aluminum and concrete, said sealant composition consisting essentially of a liquid polythiopolymercaptan polymer and from 0.5% to 10% by weight of said sealant composition of a liquid polymercapto adhesion-promoting additive which is a linear condensation product of at least one dicarboxylic acid and at least one dihydric alcohol, at least one of said dicarboxylic acid and said dihydric alcohol having at least one mercapto group and at least one of said dihydric alcohols being a thiodiglycol, said condensation product having an average of 200 to 1500 molecular weight units per mercapto group.

2. A sealant composition according to claim 1 wherein said adhesion-promoting additive is a condensation product of a mercapto dicarboxylic acid, a dicarboxylic acid free from mercapto groups and a thiodiglycol.

3. A sealant composition according to claim 1 wherein said adhesion-promoting additive is a condensation product of a mercaptoglycol, a thiodiglycol and a dicarboxylic acid free from mercapto groups.

4. A sealant composition according to claim 1 wherein said adhesion-promoting additive is a condensation product of a mercaptodicarboxylic acid, a dicarboxylic acid free from mercapto groups, a dihydric alcohol free from mercapto groups and a thiodiglycol.

5. A liquid sealant composition according to claim 1 wherein said dicarboxylic acids include thiomalic acid and said thiodiglycol is thiodiethylene glycol.

6. A liquid sealant composition according to claim 1 wherein said adhesion-promoting additive is a condensation product of thiodiethylene glycol, azaleic acid and thiomalic acid.

7. A liquid sealant composition according to claim 1 wherein said adhesion-promoting additive is a condensation product of thiodiethylene glycol, diethylene glycol, azaleic acid and thiomalic acid.

8. A liquid sealant composition according to claim 1 wherein said adhesion-promoting additive is a condensation product of thiodiethylene glycol, adipic acid and thiomalic acid.

9. A liquid sealant composition according to claim 1 wherein said adhesion-promoting additive is a condensation product of thiodiethylene glycol, diethylene glycol, phthalic anhydride and thiomalic acid.

10. A liquid adhesion-promoting additive adapted to be incorporated in a polysulfide sealant composition to improve the adhesion of the cured sealant composition to substrates such as glass, aluminum and concrete, said additive consisting essentially of a linear condensation product of at least one dicarboxylic acid and at least one dihydric alcohol, at least one of said dicarboxylic acid and said dihydric alcohol having at least one mercapto group and at least one of said dihydric alcohols being a thiodiglycol, said condensation product having an average of 200 to 1500 molecular weight units per mercapto group.

11. An adhesion-promoting additive according to claim 10 which is a condensation product of a mercapto dicarboxylic acid, a dicarboxylic acid free from mercapto groups and a thiodiglycol.

12. An adhesion-promoting additive according to claim 10 which is a condensation product of a mercaptoglycol, a thiodiglycol and a dicarboxylic acid free from mercapto groups.

13. An adhesion-promoting additive according to claim 10 which is a condensation product of a mercaptodicarboxylic acid, a dicarboxylic acid free from mercapto groups, a dihydric alcohol free from mercapto groups and a thiodiglycol.

14. An adhesion-promoting additive according to claim 10 wherein said dicarboxylic acids include thiomalic acid and said thiodiglycol is thiodiethylene glycol.

15. An adhesion-promoting additive according to claim 10 which is a condensation product of thiodiethylene glycol, azaleic acid and thiomalic acid.

16. An adhesion-promoting additive according to claim 10 whic is a condensation product of thiodiethylene glycol, diethylene glycol, azaleic acid and thiomalic acid.

17. An adhesion promoting additive according to claim 10 which is a condensation product of thiodiethylene glycol, adipic acid and thiomalic acid.

18. An adhesion-promoting additive according to claim 10 which is a condensation product of thiodiethylene glycol, diethylene glycol, phthalic anhydride and thiomalic acid.

19. An elastomeric seal comprising the cured composition of claim 1.

References Cited
UNITED STATES PATENTS

| | | | |
|---|---|---|---|
| 2,356,586 | 8/1944 | Hentrich et al. | 260—75 S |
| 2,456,314 | 12/1948 | Pratt | 260—75 S |
| 2,469,141 | 5/1949 | Alexander | 260—860 |
| 2,527,374 | 10/1950 | Patrick et al. | 260—455 R |
| 2,813,086 | 11/1957 | Robitschek et al. | 260—75 S |
| 3,513,133 | 5/1970 | Weesner | 260—75 S |

WILLIAM H. SHORT, Primary Examiner

E. WOODBERRY, Assistant Examiner

U.S. Cl. X.R.

117—161 K, 187, 194, 231; 260—79.1, 455 R, 823, 860